(12) United States Patent
Li

(10) Patent No.: US 11,967,891 B2
(45) Date of Patent: Apr. 23, 2024

(54) MITIGATION OF HARMONIC DISTURBANCES IN A POWER CONVERTER

(71) Applicant: Eaton Intelligent Power Limited, Dublin (IE)

(72) Inventor: Huaqiang Li, Menomonee Falls, WI (US)

(73) Assignee: Eaton Intelligent Power Limited, Dublin (IE)

( * ) Notice: Subject to any disclaimer, the term of this patent is extended or adjusted under 35 U.S.C. 154(b) by 152 days.

(21) Appl. No.: 17/672,432

(22) Filed: Feb. 15, 2022

(65) Prior Publication Data

US 2023/0261561 A1 Aug. 17, 2023

(51) Int. Cl.
| | | |
|---|---|---|
| *H02M 1/12* | (2006.01) | |
| *H02J 3/01* | (2006.01) | |
| *H02M 1/00* | (2006.01) | |
| *H02M 5/458* | (2006.01) | |
| *H02P 27/08* | (2006.01) | |

(52) U.S. Cl.
CPC ............. *H02M 1/12* (2013.01); *H02J 3/01* (2013.01); *H02M 1/0009* (2021.05); *H02M 5/458* (2013.01); *H02P 27/08* (2013.01)

(58) Field of Classification Search
CPC .... H02M 1/12; H02M 5/4505; H02M 1/0009; H02M 3/33584; H02M 5/4585; H02M 7/162; H02M 7/219; H02M 1/126; H02M 1/0025; H02M 7/487; H02M 7/5395; H02M 5/10; H02M 7/2195; H02M 5/458; H01F 30/12; H02P 27/08; H02P 13/06; H02P 27/06; H02P 27/04; H02P 11/00; H02P 11/04; H02P 11/06; H02P 13/00; H02P 27/00; H02P 21/00; H02P 21/14; H02P 29/50; H02P 23/07; H02P 23/14; H02P 29/40; H02P 2201/03; H02P 2201/07; H02J 3/01

See application file for complete search history.

(56) References Cited

U.S. PATENT DOCUMENTS

2013/0033907 A1* 2/2013 Zhou .................... H02J 3/01
363/37
2017/0272023 A1 9/2017 Ahmed et al.

OTHER PUBLICATIONS

Akagi, "Active Harmonic Filters," Proc. IEEE, vol. 93, No. 12, pp. 2128-2141 (2005).

(Continued)

*Primary Examiner* — Antony M Paul
(74) *Attorney, Agent, or Firm* — DiBerardino McGovern IP Group LLC

(57) ABSTRACT

A bi-directional power converter includes: a plurality of input nodes, each input node configured to electrically connect to one phase of a multi-phase AC electrical power distribution network; and an electrical network configured to convert alternating current (AC) to direct current (DC) and to convert DC current to AC current, the electrical network including a plurality of electronic switches. The bi-directional power converter also includes a control system configured to: estimate harmonic voltage content at three intermediate nodes in the bi-directional power converter based on a measured electrical quantity; and control the electronic switches to compensate for the estimated harmonic voltage content.

17 Claims, 6 Drawing Sheets

(56) References Cited

OTHER PUBLICATIONS

Brogan and Yacamini, "Harmonic control using an active drive," IEE Proc.-Electr. Power Appl., vol. 150, No. 1, pp. 14-20 (2003).
Collins, "What are the benefits of an active front end (AFE) drive?" Motion Control Tips, available at https://www.motioncontroltips.com/what-are-the-benefits-of-an-active-front-end-afe-drive/ (2018).
HarmonicGuard® Series Bus-Applied Active Harmonic Filter Installation, Operation, and Maintenance Manual, TCI, LLC (2020).
Lee et al., "System harmonic interaction between DC and AC adjustable speed drives and cost effective mitigation," 2015 IEEE Energy Conversion Congress and Exposition (ECCE), pp. 4069-4076 (2015).
Muhlethaler et al., "Optimal Design of LCL Harmonic Filters for Three-Phase PFC Rectifiers," IEE Transactoins on Power Electronics, vol. 28, No. 7, pp. 3114-3125 (2013).
Sirisukprasert, "Selective Harmonic Eliminated Pulse Width Modulation (SHE PWM)," Chapter 4, pp. 62-72, Optimized Harmonic Stepped-Waveform for Multilevel Inverter, Masters Thesis, Virginia Polytechnic Institute and State University (1999).
Teodorescu et al., "Proportional-resonant controllers and filters for grid-connected voltage-source converters," IEE Proc.-Electr. Power Appl., vol. 153, No. 5, pp. 750-762 (2006).

\* cited by examiner

MITIGATION OF HARMONIC DISTURBANCES IN A POWER CONVERTER

TECHNICAL FIELD

This disclosure relates to mitigation, reduction, and/or elimination of harmonic disturbances in a power converter, for example, a bi-directional power converter.

BACKGROUND

An electrical apparatus, such as a variable speed drive, an adjustable speed drive, or an uninterruptable power supply, may be connected to an alternating current (AC) high-power electrical distribution system, such as a power grid. The electrical apparatus drives, powers, and/or controls a machine, or a non-machine type of load. The electrical apparatus includes an electrical network that converts AC power to direct current (DC) power.

SUMMARY

In one aspect, a bi-directional power converter includes: a plurality of input nodes, each input node configured to electrically connect to one phase of a multi-phase AC electrical power distribution network; and an electrical network configured to convert alternating current (AC) to direct current (DC) and to convert DC current to AC current, the electrical network including a plurality of electronic switches. The bi-directional power converter also includes a control system configured to: estimate harmonic voltage content at three intermediate nodes in the bi-directional power converter based on a measured electrical quantity; and control the electronic switches to compensate for the estimated harmonic voltage content.

Implementations may include one or more of the following features.

The bi-directional power converter also may include a filter system between the input nodes and the electrical network. The intermediate nodes may be between the filter system and the electrical network. The measured electrical quantity may include an indication of an AC current that flows in each of the three intermediate nodes. The filter system may include: a first filter electrically connected to a first one of the input nodes and to a first one of the three intermediate nodes, the first filter system including: a first grid-side inductor, a first converter-side inductor, and a first capacitor; a second filter electrically connected to a second one of the input nodes and to a second one of the three intermediate nodes, the second filter system including: a second grid-side inductor, a second converter-side inductor, and a second capacitor; and a third filter electrically connected to a third one of the input nodes and to a third one of the three intermediate nodes, the third filter system including: a third grid-side inductor, a third converter-side inductor, and a third capacitor.

The measured electrical quantity may include a measured AC current at each intermediate node.

The measured electrical quantity may include an indication of an AC current that flows in at least two of the intermediate nodes.

In some implementations, to compensate for the estimated harmonic voltage content, the control system controls the electronic switches to reduce harmonic current content at the plurality of input nodes.

In some implementations, to compensate for the estimated harmonic voltage content, the controller is configured to: generate a control signal based on the estimated harmonic voltage content; and to apply the control signal to the electronic switches to generate a waveform that compensates for the estimated harmonic voltage content, such that harmonic current content at the plurality of input nodes is reduced.

The multi-phase AC electrical power distribution network may include: a first phase, a second phase, and a third phase; and the control system may include: a first control block including a first harmonic compensator configured to estimate harmonic voltage content at the first intermediate node; a second control block including a second harmonic compensator configured to estimate harmonic voltage content at the second intermediate node; and a third control block including a third harmonic compensator configured to estimate harmonic voltage content at the third intermediate node.

Each of the plurality of electronic switches may be a transistor.

The electrical network may include a rectifier and an inverter, and the inverter may be configured to produce an AC driver signal for a motor load.

The electrical network may be an active front end (AFE) rectifier.

In another aspect, a control system includes: a voltage regulation block configured to determine an AC reference current value based on a DC electrical quantity of a power converter; and a current regulation block configured to receive the AC reference current value, the current regulation block including: a harmonics compensation block configured to estimate harmonic voltage content at an intermediate node of the power converter based on an AC current at the intermediate node; and a control block configured to generate a voltage control signal based on the estimated harmonic voltage content, and to provide the voltage control signal to the power converter to reduce harmonic current content at an input node of the power converter. The input node of the power converter is electrically connected to an alternating current (AC) power grid.

Implementations may include one or more of the following features. The power converter may include a bi-directional power converter.

In another aspect, harmonic voltage content is estimated at least two intermediate nodes of a power converter based on a measured AC current at the at least two intermediate nodes; a voltage control signal is generated for the power converter based on the estimated harmonic voltage content; and the voltage control signal is provided to the power converter to thereby reduce the total harmonic distortion at input nodes of the power converter. Each input node is electrically connected to one phase of a three-phase alternating current (AC) power grid.

Implementations may include one or more of the following features.

The harmonic voltage content may be estimated for each of at three intermediate nodes of the power converter based on a measured AC current at each of the three intermediate nodes, and the voltage control signal may be generated for each of three phases of the power converter. A voltage control signal may be provided to each phase of an active front end of the power converter.

Implementations of any of the techniques described herein may include an apparatus, a device, a system, and/or a method. The details of one or more implementations are set forth in the accompanying drawings and the description below. Other features will be apparent from the description and drawings, and from the claims.

DRAWING DESCRIPTION

DETAILED DESCRIPTION

Figure 1:
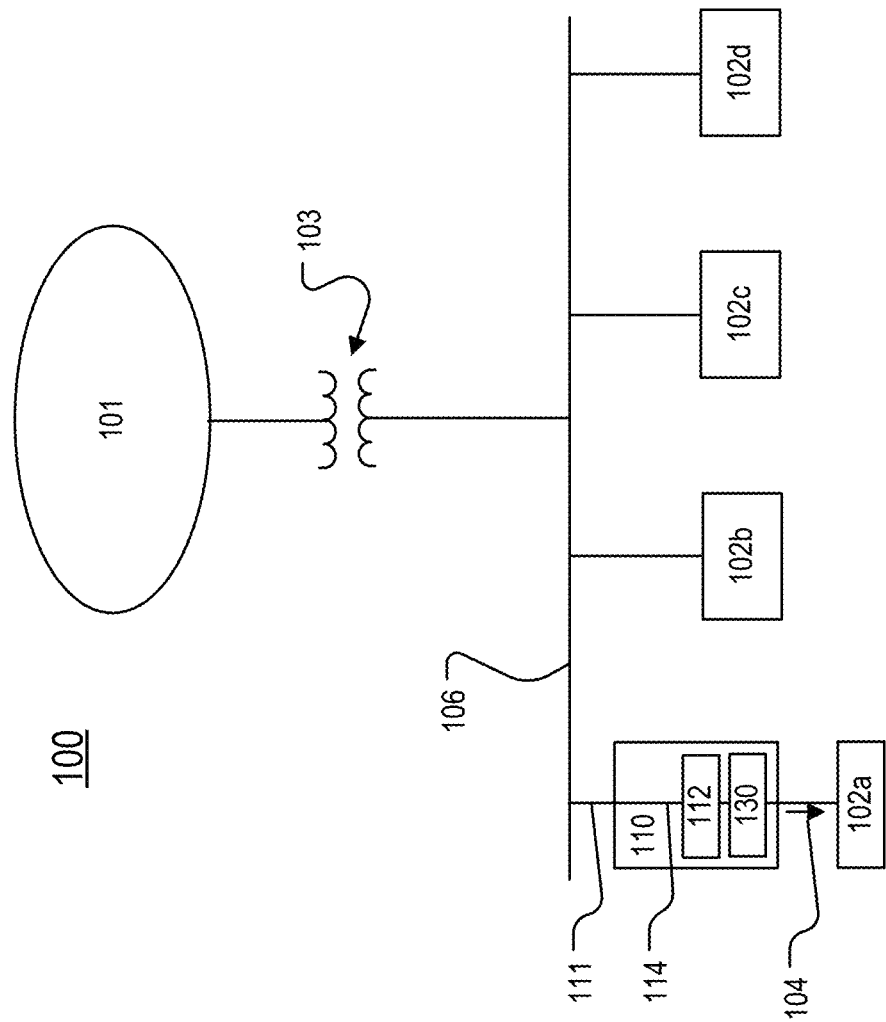
FIG. 1 is a block diagram of an example of a power system.

FIG. 1 is a block diagram of an example of a power system 100. The power system 100 includes a bi-directional power converter 110 that is electrically connected to a point of common coupling (PCC) 106 via an input node 111. The PCC 106 is the point where customer-owned or customer-supplied equipment is connected to an alternating current (AC) electrical power distribution network 101. The bi-directional power converter 110 allows power flow in two directions: from the PCC 106 to a load 102a and from the load 102a to the PCC 106. The bi-directional power converter 110 is also configured to convert AC power to DC power and DC power to AC power. The bi-directional power converter 110 includes an electrical network 112 of controllable electronic switches, and a control system 130 that controls the state of the controllable electronic switches. The control system 130 controls the electrical network 112 to convert AC power from the PCC 106 to DC power. In some implementations, the electrical network 112 also produces an AC driver signal 104 for the load 102a from the DC power. For example, in implementations in which the load 102a is a motor-type load, the electrical network 112 converts AC power from the PCC 106 to DC power, and produces the AC driver signal 104 from the DC power to drive the motor-type load.

As discussed in more detail below, the control system 130 also implements an observer control scheme that estimates an amount of harmonic voltage content at an intermediate node 114 and controls the electrical network 112 to compensate for the estimated harmonic voltage content to thereby reduce, control, mitigate, or eliminate harmonic disturbances (for example, current harmonics) at the bi-directional power converter input 111.

In the example of FIG. 1, additional loads 102b-102d are also electrically connected to the PCC 106. The loads 102a-102d may be any type of load used in an industrial, commercial, and/or residential application. For example, the load 102a may be equipment (such as a motor) that is driven by the bi-directional power converter 110 and used in the operation of a crane, an elevator, welding equipment, mining equipment, and/or a wind turbine. The loads 102b-102d may be different than the load 102a or the same as the load 102a. Specific examples of the loads 102b-102d include motors, uninterruptable power supplies, generators, and adjustable speed drives (AFDs), just to name a few. In some implementations, one or more of the loads 102b-102d includes more than one device. For example, the load 102b may include a variable speed drive (VFD) that drives a motor.

The electrical power distribution network 101 may be, for example, a three-phase electrical power grid that provides electricity to industrial, commercial, and/or residential customers. The AC electrical power distribution network 101 distributes AC electrical power that has a fundamental frequency of, for example, 50 or 60 Hertz (Hz). The distribution network 101 may have an operating voltage of, for example, up to 1 kilovolt (kV), at least 1 kV, 12 kV, up to 34.5 kV, up to 38 kV, or 69 kV or higher. In the example of FIG. 1, the power system 100 includes a transformer 103 between the PCC 106 and the electrical power distribution network 101. The transformer 103 steps-down or reduces the voltage of the distribution network 101 such that the AC voltage at the PCC 106 is lower than the voltage of the distribution network 101. For example, the voltage at the PCC 106 may be 480 V.

Although the AC power in the electrical power distribution network 101 is nominally sinusoidal, the AC power at the PCC 106 may include distortions in the form of current harmonics. Current harmonics are currents at frequencies that are integer multiples of the fundamental frequency. For example, the AC current at the PCC 106 may include components at the third ($3^{rd}$), fifth ($5^{th}$), seventh ($7^{th}$), and/or eleventh ($11^{th}$) harmonic of the fundamental frequency. In implementations in which the distribution network 101 has a fundamental frequency of 60 Hz, the $3^{rd}$ harmonic has a frequency of 180 Hz, the $5^{th}$ harmonic has a frequency of 300 Hz, the $7^{th}$ harmonic has a frequency of 420 Hz, and the $11^{th}$ harmonic has a frequency of 660 Hz. The current harmonics may arise from non-linear loads that are connected to the PCC 106 and/or from distortions that are present in the distribution network 101. Regardless of their source, the current harmonics cause overheating of electrical equipment (such as the transformer 103), reduce the energy efficiency and power quality, and/or cause equipment failure. Moreover, the relatively high frequency of the higher-order current harmonics (for example, the $5^{th}$ harmonic and greater) generally exceeds the bandwidth and switching speed of legacy current-controllers in high-power applications, making removal of such harmonics challenging.

Some legacy power converters are used with separate passive and/or active filters to attenuate the current harmonics at the input of the power converter. Examples of passive filters include inductors and/or capacitors that are placed in series with the input of the power converter or positioned shunt with the input of the power converter. However, these passive filters are bulky and take up space, add to the overall cost of the converter, require additional maintenance, and may reduce the efficiency of the power converter. Examples of active filters include pulse width modulation (PWM) converters, active line conditioners, and volt-ampere reactive (Var) compensators. Such active filters are separate from and in addition to the power converter and add complexity and cost to the overall system. Moreover, higher-order harmonics (for example, harmonics greater than the $5^{th}$ harmonic or $7^{th}$ harmonic) have a relatively high frequency that may exceed the bandwidth of a controller in high power converters with limited switching frequency range, in which the higher-order harmonics may be challenging to remove.

On the other hand, the bi-directional power converter 110 includes the control system 130 that compensates for harmonic current disturbances at the input of the power converter 110 by controlling electronic switches in the electrical network 112. The control system 130 is also able to compensate for the harmonic disturbances without using separate active and/or passive filters. Furthermore, the techniques implemented by the control system 130 integrate with DC link voltage and AC current regulators, making it possible to compensate distorted input source voltage effects. Moreover, because the harmonics observer or predictor implemented by the control system 130 can anticipate or predict harmonics at a future time step, the control system 130 can compensate for digital delay in microprocessor implementation.

Figure 2A:
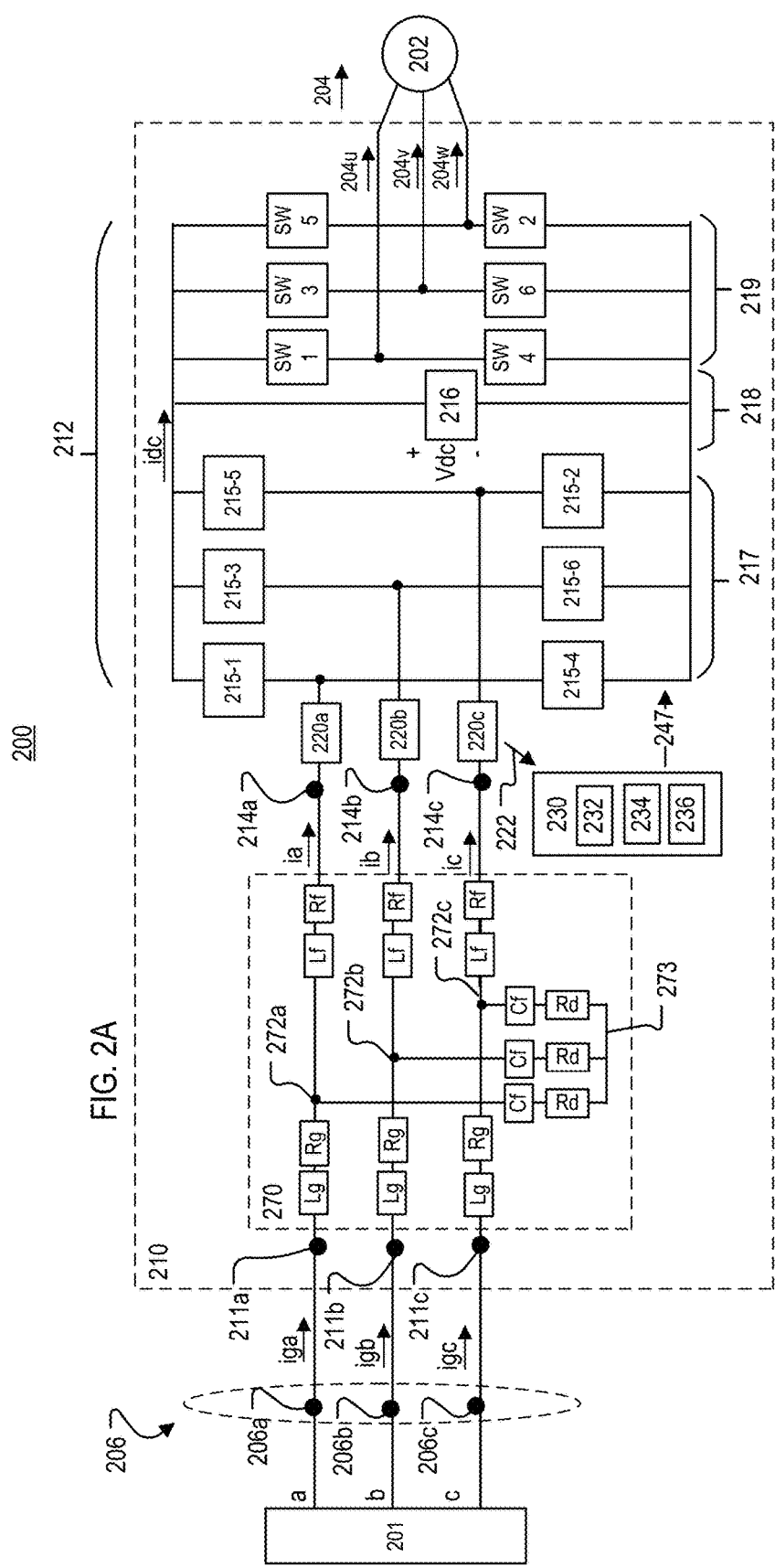
FIG. 2A is a schematic of an example of a system.
Figure 2B:
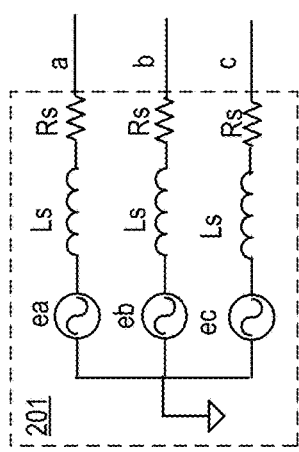
FIG. 2B is a schematic of a three-phase AC electrical power distribution network.

FIG. 2A is a schematic of a system 200. FIG. 2B is a schematic of a three-phase AC electrical power distribution network 201. The system 200 includes a bi-directional power converter 210 that is connected to a load 202 and a PCC 206 of the three-phase AC electrical power distribution network 201. The load 202 may be, for example, an induction motor or a permanent magnet synchronous machine. The dashed lines in FIG. 2A are used to show groupings of elements, and the dashed lines do not necessarily represent physical objects. However, the bi-directional power converter 210 may be in a housing or enclosure, such as a rack-mountable box or a cabinet.

The electrical power distribution network 201 distributes AC electrical power that has a fundamental frequency of, for example, 50 or 60 Hertz (Hz). The distribution network 201 may include, for example, one or more transmission lines, distribution lines, electrical cables, and/or any other mechanism for transmitting electricity. The distribution network 201 includes three phases, which are referred to as a, b, and c. Each phase has a respective voltage ea, eb, ec (FIG. 2B). The impedance of the distribution network 201 is represented by an inductor Ls in series with a resistance Rs. The impedance of the distribution network 201 depends on the impedance characteristics of the components included in the distribution network 201.

The bi-directional power converter 210 includes input nodes 211a, 211b, 211c, each of which is electrically coupled to one of the three phases (a, b, c) of the distribution network 201 at the PCC 206. The PCC 206 includes nodes 206a, 206b, 206c connected, respectively, to phase a, b, c and to the power converter input nodes 211a, 211b, 211c. Although only the bi-directional power converter 210 is shown in FIG. 2A, additional loads may be connected to the PCC 206.

The bi-directional power converter 210 also includes an LCL filter 270. The LCL filter system 270 includes inductors and capacitors, and may or may not include additional electronic components. For example, the LCL filter system 270 also includes damping resistors Rf. The LCL filter system 270 includes three LCL filters, one for each phase a, b, c. In phase a, the LCL filter 270 is connected between the PCC node 206a and an intermediate node 214a. The intermediate node 214a may be considered an input node of the electronic network 212. The LCL filter in phase a includes a grid-side inductor Lg, a converter-side inductor Lf, a filter capacitor Cf, and a damping resistor Rf in series with the filter capacitor Cf. The resistance of the converter-side inductor Lf is represented by an impedance Rf in series with the converter-side inductor Lf. The resistance of the grid-side inductor Lg is represented by an impedance Rg in series with the grid-side inductor Lg.

The grid-side inductor Lg is electrically connected to the PCC node 206a, and the converter-side inductor Lf is connected to the node 214a. The series combination of the filter capacitor Cf and the damping resistor Rd is connected to a node 272a, which is between the converter-side inductor Lf and the grid-side inductor Lg, and to a node 273. The PCC node 206b and the PCC node 206c are connected to a phase of the LCL filter 270, and each phase of the LCL filter is configured in the same manner as phase a. The series combination of the filter capacitor Cf and the damping resistor Rd of phase b is connected to a node 272b and the node 273, and the series combination of the filter capacitor Cf and the damping resistor Rd of phase c is connected to a node 272c and the node 273, as shown in FIG. 2A.

The bi-directional power converter 210 includes an electrical network 212. The electrical network 212 includes a rectifier 217, a DC link 218, and an inverter 219. The control system 230 observes the AC electrical current ia, ib, ic that flows in a respective intermediate node 214a, 214b, 214c and estimates the harmonic voltage content at each node 214a, 214b, 214c. As discussed further below, the control system 230 uses the estimated harmonic voltage to control the electrical network 212 in a manner that reduces, minimizes, compensates, or eliminates the harmonic current content at the input nodes 211a, 211b, 211c. An overview of the operation of the bi-directional power converter 210 is discussed before discussing the controller 230 in more detail.

The rectifier 217 is a three-phase, active front end (AFE) that includes six electronic switches 215-1 to 215-6 that rectify the AC currents ia, ib, ic into a DC current idc. The electronic switches 215-1 to 215-6 are any type of controllable electronic switch. For example, each switch 215-1 to 215-6 may be a transistor, such as, for example, an insulated gate bipolar transistor (IGBT) or a metal-oxide semiconductor field effect transistor (MOSFET). Each electronic switch 215-1 to 215-6 has an ON state that conducts current and an OFF state that does not conduct current. The state of each electronic switch 215-1 to 215-6 is controlled by the control system 230. For example, in implementations in which the switches 215-1 to 215-6 are transistors, the control system 230 may control the state of a particular transistor 215-1 to 215-6 by controlling the voltage at the gate of that transistor. The control system 230 may be configured to control the electronic switches 215-1 to 215-6 based on a pulse width modulation (PWM) control scheme.

The electronic switches 215-1 to 215-6 are also electrically connected to the DC link 218, which includes an energy storage apparatus 216. The energy storage apparatus 216 is any component that is capable of storing electrical energy. The energy storage apparatus 216 may be, for example, a capacitor, or a network made of such devices. The rectified current idc flows into the energy storage apparatus 216 and is stored. The energy storage apparatus 216 discharges the stored electrical energy when the load 202 is powered on by the AC to DC inverter 219.

The inverter 219 converts the DC power stored in the energy storage apparatus 216 into three-phase AC driver signal 204 that is provided to the load 202. The three-phase driver signal 204 has phase components 204u, 204v, 204w, each of which is provided to one of the three phases of the load 202. The inverter 219 includes a network of electronic switches SW1-SW6 that are arranged to generate the driver signal 204. Each of the switches SW1-SW6 may be, for example, a power transistor. Because the inverter 219 uses the electrical energy stored in the DC link 218, the driver signal 204 continues to be produced as expected and load 202 may function under normal and expected load conditions even if the magnitude of the current that flows in the rectifier 217 and into the DC link 218 increases to a level that may damage the components in the rectifier 217 and the DC link 218.

The discussion above relates to generating the AC driver signal 204 and providing the AC driver signal 204 to the load 202. However, the control system 230 also controls the electronic switches 215-1 to 215-6 and SW1-SW6 such that power can flow from the load 202 to the grid 201. Thus, energy generated by the load 202 may be returned to the grid 201 through the bi-directional power converter 210.

The bi-directional power converter 210 is provided as an example, and other configurations are possible. For example, the bi-directional power converter 210 may be implemented without the inverter 219 and configured to drive a DC load.

The system 200 also includes the sensors 220a, 220b, 220c that measure one or more electrical properties at the respective node 214a, 214b, 214c. The sensors may include voltage sensors and/or current sensors (for example, current transformers or Rogowski coils). The sensors 220a, 220b, 220c produce data 222, which includes an indication of one or more electrical properties of the power that flows at the respective nodes 214a, 214b, 214c. For example, the sensors 220a, 220b, 220c may produce numerical values that represent values of measured current and/or voltage at the nodes 214a, 214b, 214c. The system 200 also includes additional sensors. For example, the system 200 includes one or more sensors that measure the value of idc and/or Vdc (the voltage across the energy storage apparatus 216), as well as voltages and/or currents at 206a, 206b and 206c.

The control system 230 is coupled to the sensors and monitors one or more electrical properties at each node 214a, 214b, 214c using the data 222 produced by the sensors. The control system 230 estimates an amount of harmonic voltage content at the nodes 214a, 214b, 214c and produces a control signal 247 for the rectifier 217. The control signal 247 is generated based on a control scheme, as discussed in greater detail with respect to FIGS. 3, 4A, and 4B.

The control signal 247 controls the state of one or more of the switches 215-1 to 215-6 such that the switches 215-1 to 215-6 generate a waveform that cancels the estimated harmonic voltage content at the nodes 214a, 214b, 214c, thereby reducing, minimizing, or eliminating harmonic current content at the input nodes 211a, 211b, 211c.

The control system 230 includes an electronic processing module 232, an electronic storage 234, and an input/output (I/O) interface 236. The electronic processing module 232 includes one or more electronic processors. The electronic processors of the module 232 may be any type of electronic processor and may or may not include a general purpose central processing unit (CPU), a graphics processing unit (GPU), a microcontroller, a field-programmable gate array (FPGA), Complex Programmable Logic Device (CPLD), and/or an application-specific integrated circuit (ASIC).

The electronic storage 234 may be any type of electronic memory that is capable of storing data and instructions in the form of computer programs or software, and the electronic storage 234 may include volatile and/or non-volatile components. The electronic storage 234 and the processing module 232 are coupled such that the processing module 232 is able to access or read data from and write data to the electronic storage 234. The electronic storage 234 stores instructions that, when executed, cause the electronic processing module 232 to analyze data and/or retrieve information. For example, the electronic storage 234 includes instructions that cause the processing module 232 to analyze the data 222. In another example, the electronic storage 234 includes instructions in the form of software, subroutines, and/or functions that implement the control scheme 300 of FIG. 3. The electronic storage 234 also stores parameters that are used in the control scheme 300. For example, the electronic storage 234 may store default and/or pre-defined values of various target voltage and/or currents and various other target values.

The I/O interface 236 is any interface that allows a human operator, another device, and/or an autonomous process to interact with the control system 230. The I/O interface 236 may include, for example, a display (such as a liquid crystal display (LCD)), a keyboard, audio input and/or output (such as speakers and/or a microphone), visual output (such as lights, light emitting diodes (LED)) that are in addition to or instead of the display, serial or parallel port, a Universal Serial Bus (USB) connection, and/or any type of network interface, such as, for example, Ethernet. The I/O interface 236 also may allow communication without physical contact through, for example, an IEEE 802.11, Bluetooth, or a near-field communication (NFC) connection. The control system 230 may be, for example, operated, configured, modified, or updated through the I/O interface 236. For example, in some implementations, an operator may enter values for various parameters for the control scheme 300 through the I/O interface 236.

The I/O interface 236 also may allow the control system 230 to communicate with components in the system 200 and with systems external to and remote from the system 200. For example, the I/O interface 236 may include a communications interface that allows communication between the control system 230 and a remote station (not shown), or between the control system 230 and a separate monitoring apparatus. The remote station or the monitoring apparatus may be any type of station through which an operator is able to communicate with the control system 230 without making physical contact with the control system 230. For example, the remote station may be a computer-based work station, a smart phone, tablet, or a laptop computer that connects to the motor control system 230 via a services protocol, or a remote control that connects to the control system 230 via a radio-frequency signal.

Figure 3:
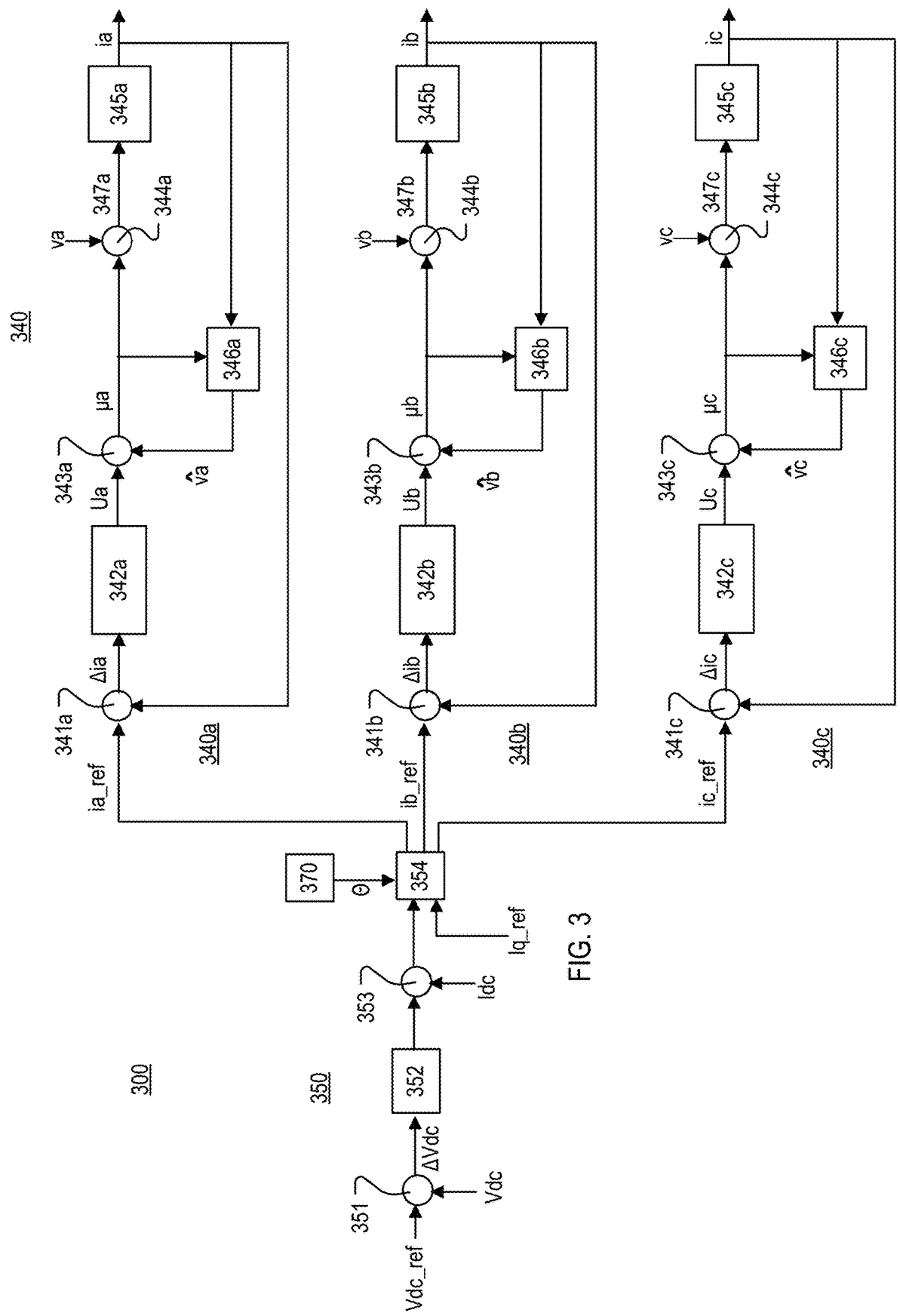
FIG. 3 is a block diagram of an example of a control scheme.

FIG. 3 is a block diagram of a control scheme 300 that may be implemented by the control system 230. The control scheme 300 includes current regulator blocks 340a, 340b, and 340c. The input to the current regulator block 340a is ia_ref, the input to the current regulator block 340b is ib_ref, and the input to the current regulator block 340c is ic_ref. The inputs ia_ref, ib_ref, and ic_ref are the target or reference current values for the current at the node 214a, 214b, and 214c, respectively.

The control scheme 300 also includes a voltage regulator block 350 that produces the inputs ia_ref, ib_ref, and ic_ref. The voltage regulator block 350 includes a comparator 351, a proportion-integral (PI) controller 352, a comparator 353, and a transformation block 354. The inputs to the comparator 351 are Vdc, which is the voltage across the energy storage apparatus 216, and Vdc_ref, which is the target or reference DC voltage across the energy storage apparatus 216. The target voltage Vdc_ref may be stored in the electronic storage 334 or entered via the I/O interface 236. The comparator 351 determines the error or difference between Vdc and Vdc_ref and provides the difference (ΔVdc) to the PI controller 352. The PI controller 352 regulates ΔVdc to a target value, which may be zero (0). In other words, the PI controller 352 acts to reduce the difference between Vdc and Vdc_ref. The PI controller 352 may be implemented based on Equation (1):

$$Kp + \frac{Ki}{s},\qquad\text{Equation (1)}$$

where Kp and Ki are gain constants that each have a numerical value that is greater than zero. The output of the PI controller 352 is provided to the comparator 353, which adds the output of the PI controller 352 to Idc. The output of the comparator 353 is an estimate Id_ref, which is provided to the transformation block 354. The other input to the transformation block 354 is Iq_ref. The value of Iq_ref may be a pre-defined constant or may be entered into the control system 230 by an operator. The value of Iq_ref is a constant and may be zero (0).

The transformation block 354 implements a dq to abc transformation via the inverse Park transformation, which converts input signals that are in a d-q reference frame to orthogonal components in a two-dimensional stationary αβ reference frame, and the inverse Clarke transformation, which converts the αβ components produced by the inverse Park transformation into three-phase AC quantities. Together, the d-axis and the q-axis form a rectangular d-q coordinate system that rotates synchronously with an AC quantity (the phase angle θ of the grid 201 in this example). In this example, the signals in the d and q references are Id_ref and Iq_ref, respectively, and the three-phase AC quantities are ia_ref, ib_ref, and ic_ref.

The transformation block 354 is implemented with the inverse Park transformation, as shown in Equation (2):

$$\begin{bmatrix} f_\alpha \\ f_\beta \end{bmatrix} = \begin{bmatrix} \cos\theta & -\sin\theta \\ \sin\theta & \cos\theta \end{bmatrix} \begin{bmatrix} d \\ q \end{bmatrix},\qquad\text{Equation (2)}$$

where θ is the phase angle of the grid 201; d is Id_ref; q is Iq_ref; and fα, fβ are orthogonal components in the stationary αβ reference frame. The angle θ is determined by an angle determination block 360 that implements a phase-locked loop that detects the phase angle of the grid 201. The angle determination block 360 is discussed below. The inverse Clarke transformation uses fα, fβ to determine the three-phase AC quantities ia_ref, ib_ref, ic_ref as shown in Equation (3):

$$\begin{bmatrix} a \\ b \\ c \end{bmatrix} = \begin{bmatrix} 1 & 0 & 1 \\ -\frac{1}{2} & \frac{\sqrt{3}}{2} & 1 \\ -\frac{1}{2} & -\frac{\sqrt{3}}{2} & 1 \end{bmatrix} \begin{bmatrix} f_\alpha \\ f_\beta \\ 0 \end{bmatrix},\qquad\text{Equation (3)}$$

where fα, fβ are the orthogonal components output by the inverse Park transformation, a is ia_ref, b is ib_ref, and c is ic_ref.

Figure 4A:
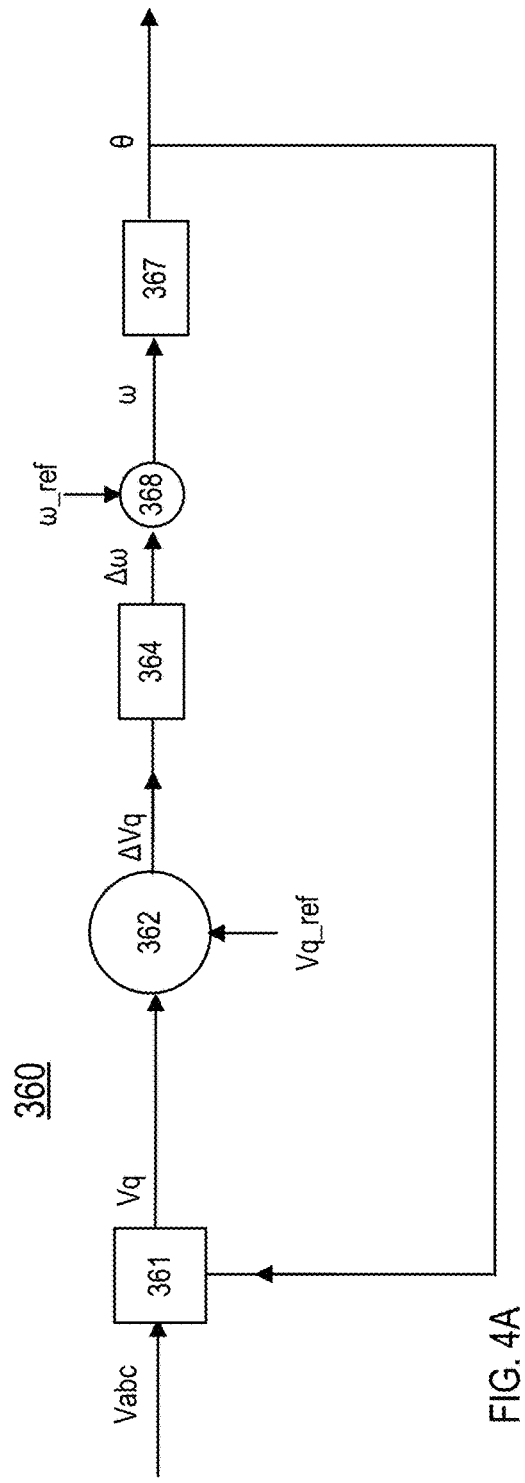
FIG. 4A is a block diagram of an example of an angle determination block.

Referring also to FIG. 4A, a block diagram of the angle determination block 360 is shown. The angle determination block 360 implements a phase-locked loop (PLL) technique to determine or detect the angle θ. The angle determination block 360 includes a transformation module 361 that receives Vabc, which is an indication of the measured AC grid voltage at each of the PCC nodes 206a, 206b, 206c. For example, the indication of the measured AC grid voltage at each of the PCC nodes 206a, 206b, 206c may be information, such as numerical data, that indicates the amplitude of the instantaneous voltage measured by a sensing system coupled to the PCC 206 at a particular time. The transformation module 361 converts the indications of the instantaneous voltage at the PCC nodes 206a, 206b, 206c into a voltage component on the d-axis (Vd) and a voltage component on the q-axis (Vq). For example, the transformation module 361 may implement the Clarke or α-β transformation that transforms the indication of the three-phase instantaneous voltage into two current components in a stationary rectangular two-dimensional coordinate system followed by the Park or d-q transformation that transforms the two α-β voltage components into the d-q coordinate system. The Park and Clarke transformations are the non-inverted forms of the inverse Park transformation (Equation 2) and inverse Clarke transformation (Equation 3), respectively.

The Vq current component is compared to a target value Vq_ref at a comparator 362 to determine an error value (ΔVq). The target value Vq_ref is a constant and may be zero. The target value Vq_ref may be stored on the electronic storage 234 or input via the I/O interface 236. The comparator 362 may be implemented in software or hardware, and the comparator 362 is configured to determine an absolute value of the difference between the target value Vq_ref and the Vd voltage component.

The angle determination block 360 also includes a PI control module 364 that implements Equation (1) and outputs Δω, which is an estimate of the grid voltage angular frequency change. The PI control module 364 regulates ΔVq to the target value Vq_ref, which may be 0. The angle determination block 360 also includes an adder 368, which adds the estimate of the grid voltage angular frequency change (Δω) to a reference angular frequency (ω_ref). The reference angular frequency is set to the value of the grid 201 fundamental frequency (for example, 2*π*60 for implementations in which the grid 201 has a fundamental frequency of 60 Hz). The output of the adder 368 is an estimate of the grid voltage phase angle (ω). The estimate of the grid voltage phase angle (ω) is input into an integrator or delay block 367 to obtain an estimate of the grid voltage phase angle (θ). The value of θ is provided to the transformation block 354 and used to determine the ia_ref, ib_ref, ic_ref AC reference current components as discussed above. The value of θ is also fed back to the transformation module 361 of the angle determination module 360 to continue to improve the estimate of the value of θ.

The variables ia_ref, ib_ref, and ic_ref produced by the transformation block 354 are AC quantities. The outputs of the transformation block 354 are provided to the current regulator 340 as follows: ia_ref is an input to the current regulator 340a, ib_ref is an input to the current regulator 340b, and ic_ref is an input to the current regulator 340c. The current regulators 340a, 340b, and 340c are substantially the same, and only the current regulator 340a is discussed in detail.

The current regulator 340a includes a comparator 341a, a proportional resonant (PR) controller 342a, a comparator 343a, an adder 344a, a PWM controller 345a, and a harmonic compensation block 346a. The ia_ref is provided to the comparator 341a. The comparator 341a compares ia_ref to ia, which is the measured current at the input node 214a included in the data 222. For example, the sensor 220a may measure the value of the current ia and provide an indication of the value of ia to the control system 230, and that value is provided as an input to the comparator 341a. In another example, the sensor 220a measures a voltage value at the node 214a, determines a current value ia from the measured voltage, and provide an indication of the determined current value ia to the comparator 341a.

The comparator 341a may compare ia_ref to ia by subtracting ia_ref from ia or vice versa. In some implementations, the comparator 341a determines an absolute value of the difference between ia_ref and ia. The value of ia_ref is a reference or target value for the current in the first node 214a. The difference between ia_ref and ia is an error value (Δia) that represents the difference between the target AC current and actual AC current at the node 214a. The error value Δia is provided to the proportional resonant controller 342a.

The proportional resonant controller 342a is implemented as shown in Equation 3:

$$Ua(s) = \frac{K_i \omega s}{s^2 + 2\omega s + \omega_0^2},\qquad \text{Equation (4)}$$

where Ki is an integral gain term, ω0 is the fundamental frequency of the grid 101 in radians (for example, in implementations in which the fundamental frequency is 60 Hz, ω0 is 2*π*60 Hz), and ω is the bandwidth around the fundamental frequency in radians. The proportional resonant controller 342a provides gain at the resonant (or fundamental) frequency and almost no gain at other frequencies. The output of the controller 342a is Ua, which is a voltage error value primarily at the fundamental frequency. The output of the controller 342a is provided to the comparator 343a.

The current regulator 340a also includes a harmonic compensation block 346a. The inputs to the harmonic compensation block 346a are the current ia (the current at the node 214a) and μa. The output of the harmonic compensation block 346a is the predicted or estimated harmonic content ($\widehat{v_a}$) of the voltage at the node 214a and is expressed as $\widehat{v_a} = \widehat{v_{a1}} + \widehat{v_{a5}} + \widehat{v_{a7}} + \ldots \widehat{v_{an}}$, where n is an integer number that represents the harmonic, with n=1 being the fundamental harmonic. Additional details of the predictor 346a are discussed with respect to FIG. 4B.

The predicted harmonic content ($\widehat{v_a}$) is provided to the comparator 343a, which subtracts the predicted harmonic content ($\widehat{v_a}$) from the voltage error value Ua to produce an output μa. The output μa is provided to the adder 344a, which adds the output μa to the voltage from the grid 201 that is present at the input node 214a. The voltage (va) from the grid 201 at the node 214a is expressed as $v_a = v_{a1} + v_{a5} + v_{a7} + \ldots + v_{an}$, where n is an integer number that represents the harmonic, with n=1 being the fundamental harmonic. The output of the adder 344a is a voltage control signal 347a that represents the voltage at the node 214a from the grid 201 with the predicted harmonic content subtracted or removed. The output μa is also provided to the predictor 346a. The predictor 346a analyzes the inputs μa and ia to estimate of the harmonic voltage in the output $\widehat{v_a}$.

The voltage control signal 347a is provided to the PWM controller 345a, which outputs a compensated version of ia (the current at the node 214a). The PWM controller 345a controls the switching of the electronic switches 215-1 to 215-6 based on the voltage control signal 347a. As discussed above, the voltage control signal 347a represents the voltage at the node 214a with the estimated harmonics removed. Thus, applying the voltage control signal 347a to the switches 215-1 to 215-6 removes the predicted harmonic voltage from the voltage at the node 214a. Specifically, the control signal 347a generates a voltage that, when applied to the switches 215-1 to 215-6, causes the switches 215-1 to 215-6 to generate a waveform that cancels the estimated harmonic voltage at the node 214a and reduces or removes the harmonic content in the observed current (ia). In this way, the harmonic content in the current (ia) that flows in the node 214a is removed or minimized, and the harmonic content at the input node 211a is also removed or minimized.

Figure 4B:
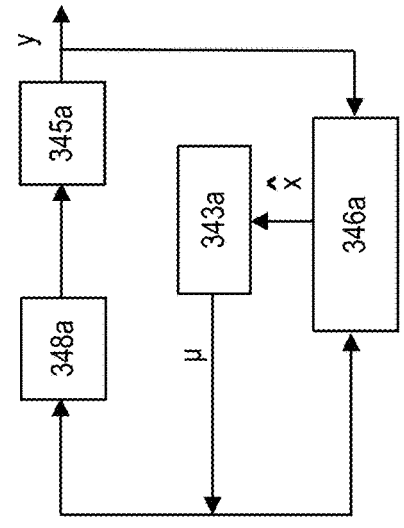
FIG. 4B is a block diagram of a harmonics compensation block, a control block, a plant block, and an output block.

FIG. 4B is a block diagram of the harmonics compensation block 346a, a control block 343a (the comparator 343a), a plant block 348a, and an output block 345a (the PWM controller 345a). The input to the harmonics compensation block 346a is the measured current at the node 214a (ia). The plant block 348a is the modeled physical system, which is the voltage at the node 214a in this example. The voltage at the node 214a includes the voltage from the grid 201 and any harmonic distortion. As discussed above, the harmonic compensation block 346a outputs ($\widehat{v_a}$), which is an estimate of the harmonic voltage components at the input node 214a. The plant block 348a is modeled as a linear system with the following state-space equations:

$$\dot{x} = A \cdot x + B \cdot u \qquad \text{Equation (4),}$$

$$y = C \cdot x + D \cdot u \qquad \text{Equation (5),}$$

where x is a state-space vector, A is a matrix that maps x to its derivative and captures the dynamics of the modeled system without external inputs, u is a control input, B is a gain matrix for the control input u, y is the observation vector (and is equal to ia for phase a), and Du is a direct map from input to output and is zero (0) for this modeled system. Equations for these variables are provided below. The harmonics compensation block 346a is implemented according to Equation (6):

$$\dot{\hat{x}} = A \cdot \hat{x} + B \cdot u + K \cdot (y - C \cdot \hat{x}) \qquad \text{Equation (6),}$$

where K is a matrix that is selected so that x tracks $\hat{x}$, and x is given by Equation (7):

$$x = [i_a v_{a1} v'_{a1} v_{a5} v'_{a5} v_{a7} v'_{a7} v_{a11} v'_{a11} v_{a13} v'_{a13} \ldots]^T \qquad \text{Equation (7),}$$

and the derivative of x is given by Equation (8):

$$\dot{x} = [i'_a v'_{a1} v''_{a1} v'_{a5} v''_{a5} v'_{a7} v''_{a7} v'_{a11} v''_{a11} v'_{a13} v''_{a13} \ldots]^T \qquad \text{Equation (8),}$$

the matrix A is shown in Equation (9):

$$A = [A_i A_1 A_5 A_7 A_{11} A_{13} \ldots]^T \qquad \text{Equation (9),}$$

and the matrix B is given by Equation (10):

$$B = \left[ \frac{1}{L} \ 0 \ 0 \ 0 \ 0 \ 0 \ 0 \ 0 \ 0 \ 0 \ \ldots \right]^T, \qquad \text{Equation (10)}$$

where L is the inductance of the converter side inductor (labeled Lf in FIG. 2A). The matrix A includes sub-matrices having the forms shown in Equations (11) to (16):

$$A_i = \left[ \frac{-R}{L} \ \frac{1}{L} \ 0 \ \frac{1}{L} \ 0 \ \frac{1}{L} \ 0 \ \frac{1}{L} \ 0 \ \frac{1}{L} \ 0 \ \ldots \right], \qquad \text{Equation (11)}$$

where R is the resistance of the converter side inductor (labeled Rf in FIG. 2A) and L is the inductance of the converter side inductor (labeled Lf in FIG. 2A), $$A_1 = \begin{bmatrix} 0 & 0 & 1 & 0 & 0 & 0 & 0 & 0 & 0 & 0 & \ldots \\ 0 & -\omega_1^2 & 0 & 0 & 0 & 0 & 0 & 0 & 0 & 0 & \ldots \end{bmatrix}, \qquad \text{Equation (12)}$$

where ω1 is 2πf and f is the fundamental frequency of the grid 201, $$A_5 = \begin{bmatrix} 0 & 0 & 0 & 0 & 1 & 0 & 0 & 0 & 0 & 0 & \dots \\ 0 & 0 & 0 & -\omega_5^2 & 0 & 0 & 0 & 0 & 0 & 0 & \dots \end{bmatrix}, \quad \text{Equation (13)}$$

where ω5 is the frequency of the fifth harmonic in radians or 5*ω1, $$A_7 = \begin{bmatrix} 0 & 0 & 0 & 0 & 0 & 0 & 1 & 0 & 0 & 0 & \dots \\ 0 & 0 & 0 & 0 & 0 & -\omega_7^2 & 0 & 0 & 0 & 0 & \dots \end{bmatrix}, \quad \text{Equation (14)}$$

where ω7 is the frequency of the seventh harmonic in radians or 7*ω1, $$A_{11} = \begin{bmatrix} 0 & 0 & 0 & 0 & 0 & 0 & 0 & 0 & 1 & 0 & 0 & \dots \\ 0 & 0 & 0 & 0 & 0 & 0 & 0 & -\omega_{11}^2 & 0 & 0 & 0 & \dots \end{bmatrix}, \quad \text{Equation (15)}$$

where ω11 is the frequency of the eleventh harmonic in radians or 11*ω1, and $$A_{13} = \begin{bmatrix} 0 & 0 & 0 & 0 & 0 & 0 & 0 & 0 & 0 & 1 & \dots \\ 0 & 0 & 0 & 0 & 0 & 0 & 0 & 0 & -\omega_{13}^2 & 0 & \dots \end{bmatrix}, \quad \text{Equation (16)}$$

where ω13 is the frequency of the thirteenth harmonic in radians or 13*ω1. The matrix A may include additional submatrices that follow the pattern above. The matrix C is given by: C=[1 0 0 0 0 0 0 0 0], and the matrix D is given by: D=[0]. The form of the matrix C and the matrix D results in the variable y in Equations 4, 5, and 6 being equal to ia for phase a.

The discussion above relates to phase a. However, the current regulators 340b and 340c are implemented in the same manner. For example, the current regulator 340b includes a harmonic predictor block 346b that uses ib (the measured AC current at the node 214b) as an input. The harmonic predictor block 346b produces an estimate of the harmonic voltage content at the node 214b, and that estimate is used to produce a control signal 347b, which is provided to the PWM controller 345b. Similarly, the harmonic predictor block 346c estimates the harmonic voltage content at the node 214c, and the estimate of the harmonic content is used to produce a control signal 347c, which is applied to the PWM controller 345c. Thus, the control scheme 300 estimates the harmonic voltage content at the nodes 214a, 214b, 214c, generates control signals 347a, 347b, 347c that, when applied to the electrical network 212, reduce, eliminate, or minimize unwanted or unintended harmonic current content at each power grid node 206a, 206b, 206c (and in currents iga, igb, and igc that flow in the respective nodes 206a, 206b, 206c).

Moreover, other implementations are possible. For example, the system 200 of FIG. 2A shows three sensors 220a, 220b, 220c, each of which provides an indication of the AC current ia, ib, ic that flows in the respective node 214a, 214b, 214c. Based on Kirchhoff's law, ia+ib+ic=0. In some implementations, one of ia, ib, ic is derived from the measured currents at the other two nodes. For example, ic may be determined based on ic=−ia−ib. Thus, the system 200 may be implemented with fewer than three sensors without changing the control scheme 300, keeping in mind that if overcurrent protection is required, then it'll be more reliable to install all three phase current sensors. In another example, the voltages at the nodes 272a, 272b, 272c may be measured.

Figure 5A:
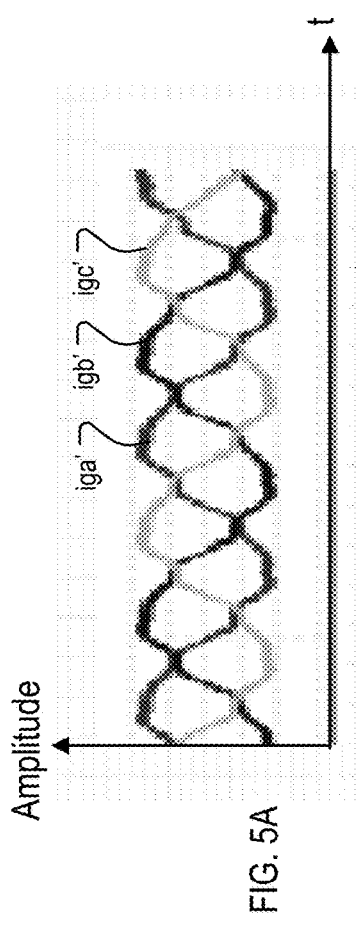
FIG. 5A is a plot of current amplitude as a function of time based on simulated data in which the control scheme of FIG. 3 was not applied.
Figure 5B:
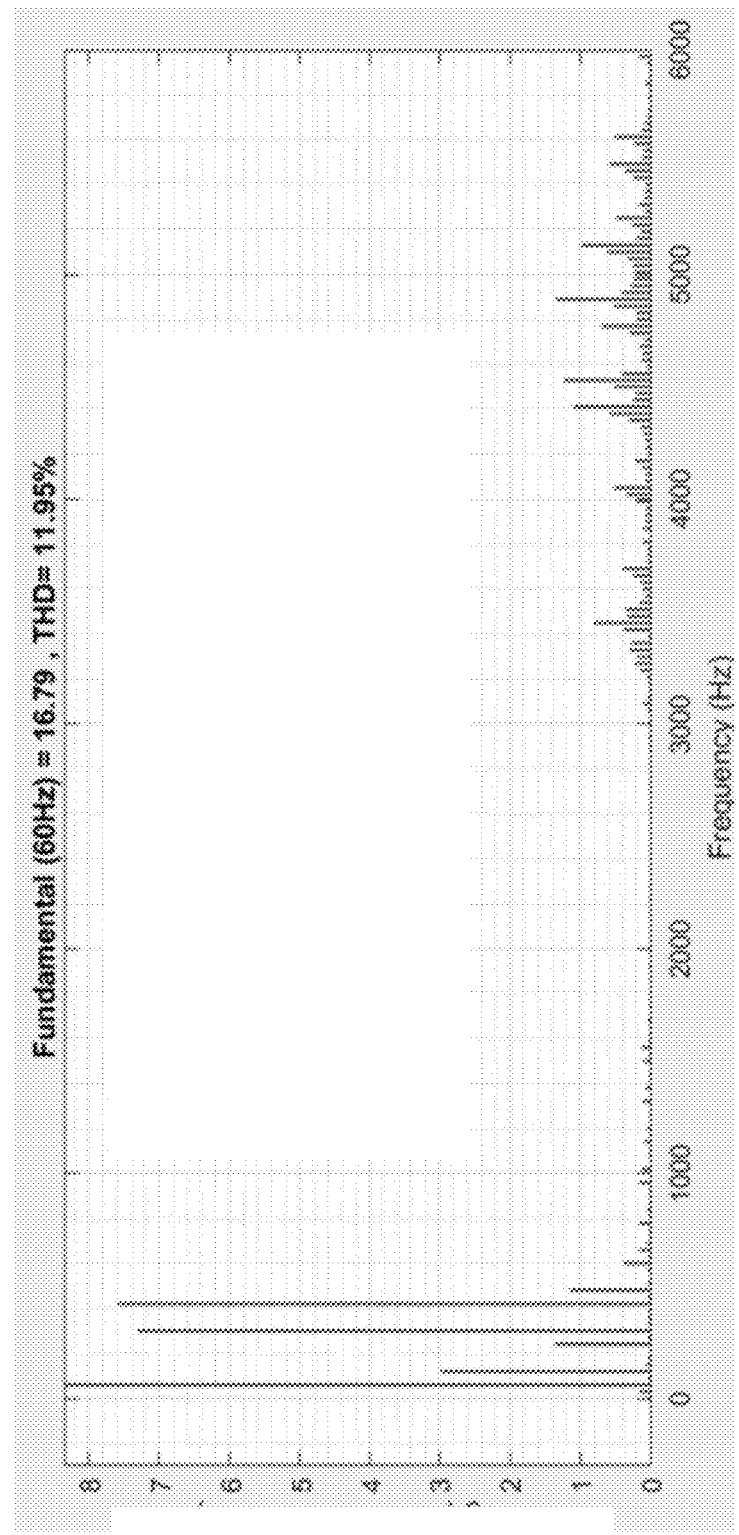
FIG. 5B is a plot of current amplitude as a function of frequency for the simulated data in which the control scheme of FIG. 3 was not applied.
Figure 6A:
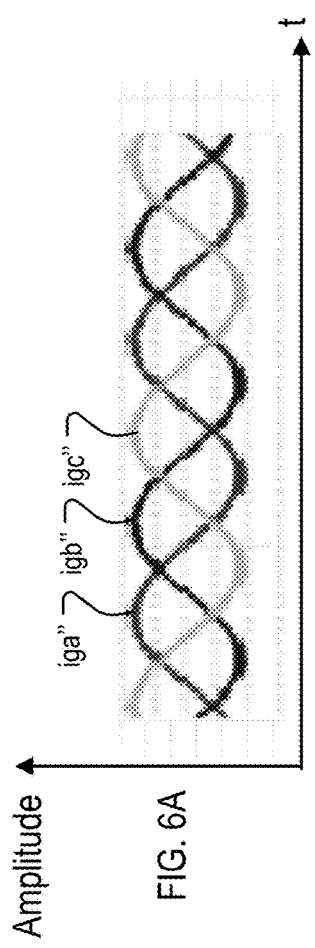
FIG. 6A is a plot of current amplitude as a function of time based on simulated data in which the control scheme of FIG. 3 was applied.
Figure 6B:
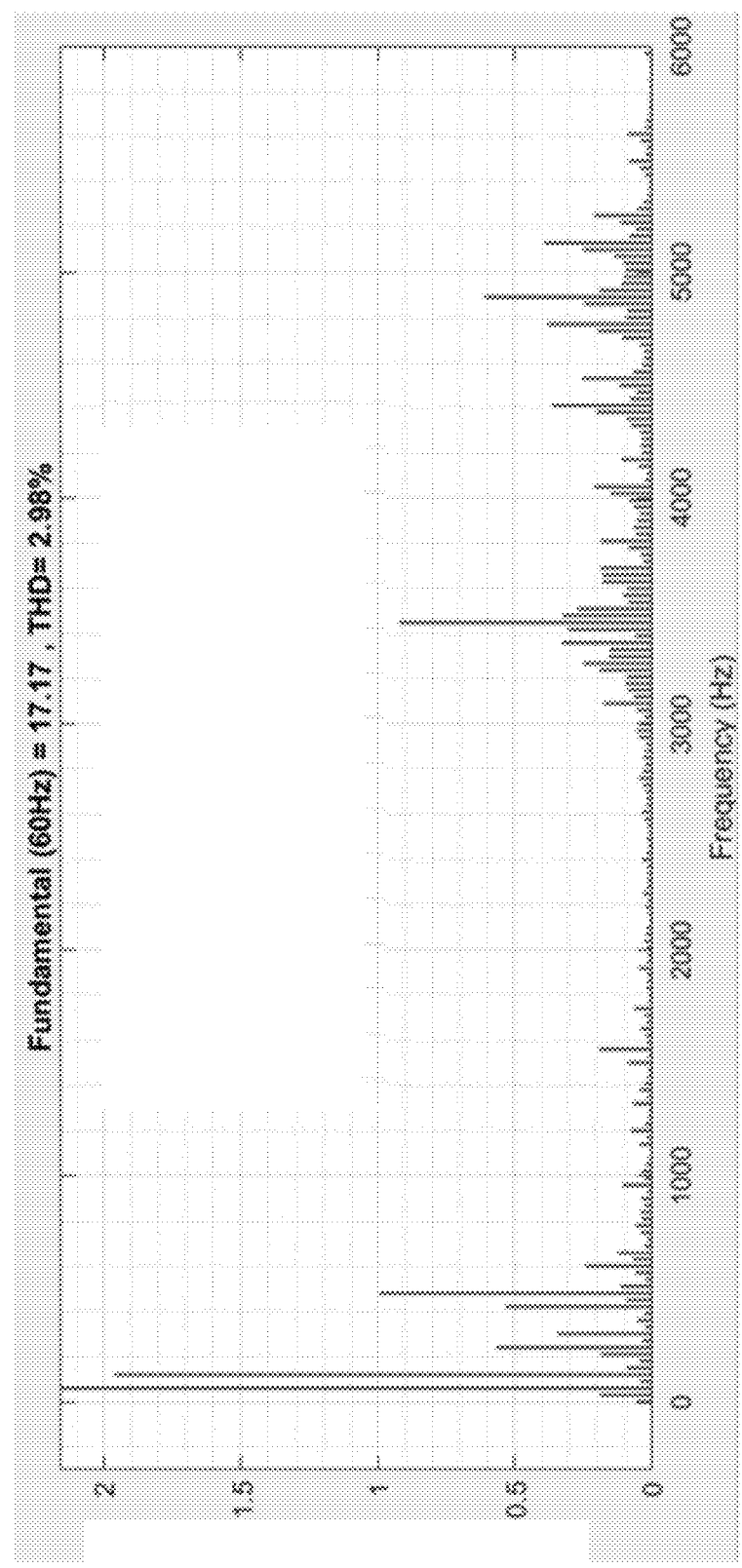
FIG. 6B is a plot of current amplitude as a function of frequency for the simulated data in which the control scheme of FIG. 3 was applied.

FIGS. 5A, 5B, 6A, and 6B show data from simulations of the bi-directional power converter 210 was connected to the PCC 206. In the simulation, there was harmonic distortion at the PCC nodes 206a, 206b, 206c. For example, the power grid 201 includes voltage sources represented as ea, eb, ec (FIG. 2B), and each of these had voltage amplitude of 380 V at the 60 Hz fundamental frequency, a voltage amplitude that was 10% of the fundamental voltage at the 5$^{th}$ voltage harmonic (38 V at 300 Hz in this example), and a voltage amplitude that was 5% of the fundamental voltage at the 7$^{th}$ voltage harmonic (19 V at 420 Hz in this example). FIGS. 5A and 5B show data from a simulation in which the control scheme 300 was not used to control the switches 215-1 to 215-6 of the rectifier 217. FIGS. 6A and 6B shows data from a simulation in which the control scheme 300 was used to control the switches 215-1 to 215-6. As discussed below, using the control scheme 300 reduced the harmonic current content at the PCC 206.

FIG. 5A is a plot of the amplitude of the current at the PCC nodes 206a (iga'), 206b (igb'), 206c (igc') as a function of time when the control scheme 300 was not used. FIG. 5B shows the frequency spectrum of the current at one of the PCC nodes when the control scheme 300 was not used. In FIG. 5B, the y-axis shows the magnitude of current at one PCC node in Amperes (A) and the x-axis is the frequency in Hz. FIG. 6A is a plot of the current at the input nodes 206a (iga"), 206b (igb"), 206c (igc") as a function of time when the control scheme 300 was used to minimize the harmonic content at the input nodes. FIG. 6B shows the frequency spectrum of the current at the PCC nodes when the control scheme 300 was used. In FIG. 6B, the y-axis shows the magnitude of current at one PCC node Amperes as a function of frequency in Hz.

The currents at the PCC nodes 206a, 206b, 206c are sinusoidal in the absence of harmonic distortion. The presence of harmonics causes the currents at the input nodes 206a, 206b, 206c to have a non-sinusoidal form. Referring to FIG. 5A, the presence of harmonic distortion is apparent in the time-domain plot of the input currents because the PCC currents iga', igb', igc' are not pure sine waves. Referring to FIG. 5B, the current component at the fundamental frequency had a magnitude of 16.59 Amperes (A), which exceeded the maximum value of the y-axis shown in FIG. 5B. As shown in FIG. 5B, the current at the PCC node also included many harmonics, some of which had relatively large amplitudes. The total harmonic distortion (THD) was 11.95%. The THD is the ratio of square root of the sum of the powers of all harmonic components to the power of the fundamental frequency. The THD may be determined using:

$$THD = \frac{\sqrt{i_2^2 + i_3^2 + i_4^2 \cdots}}{i_1}, \quad \text{Equation (17)}$$

where $i_n$ is the amplitude of the nth current harmonic and n=1 is the fundamental frequency.

FIGS. 6A and 6B show data produced when the control scheme 300 was used to reduce the harmonic content at the PCC nodes 206a, 206b, 206c. Referring to FIG. 6A, the input currents iga", igb", igc" are relatively more sinusoidal compared to the input currents iga', igb', igc' (FIG. 5A). Thus, applying the control scheme 300 reduced the harmonic content at the nodes 206a, 206b, 206c. Referring to FIG. 6B, the amplitude of the current at the fundamental frequency was 17.17 A. The amplitude of the current harmonics shown in FIG. 6B is generally substantially lower than the amplitude of the current harmonics of FIG. 5B, indicating that the control scheme 300 reduced the harmonic current content at the PCC. For example, the largest current harmonic in FIG. 6B had an amplitude of about 1.9 A. In comparison, the largest current harmonic in FIG. 5B had an amplitude of about 7.5 A, and two other current harmonics had amplitudes greater than 1.9 A. Moreover, the THD for the scenario shown in FIGS. 6A and 6B was 2.98%.

In this example, the control scheme 300 resulted in a THD that was about one-fourth of the THD prior to compensation. In other words, the THD that results when the control scheme 300 is not applied is about four times larger than the THD when the control scheme 300. Thus, applying the control scheme 300 reduces harmonic content and harmonic distortion at the PCC (or power grid) nodes 206a, 206b, 206c.

By reducing the harmonic content and harmonic distortion at the PCC 206, the control scheme 300 improves overall performance of a system in which it is used and also facilitates compliance with standards and regulations. For example, the Institute of Electrical and Electronics Engineers (IEEE) standard for voltage limits for line-to-neutral harmonics at a PCC (such as the PCC 106 or 206) is found in the IEEE-519-2014 voltage limit standard. This standard is reproduced in Table 1:

| Bus voltage (V) at PCC | Individual harmonic (%) | Total harmonic distortion THD (%) |
|---|---|---|
| V ≤ 1.0 kV | 5.0 | 8.0 |
| 1 kV < V ≤ 69 kV | 3.0 | 5.0 |
| 69 kV < V ≤ 161 kV | 1.5 | 2.5 |
| 161 Kv ≤ V | 1.0 | 1.5 |

The example simulation discussed with respect to FIGS. 5A, 5B, 6A, and 6B related to a PCC voltage of 380 V, which is less than 1.0 kV. The simulation showed that using the control scheme 300 resulted in the THD at the PCC 206 being reduced from 11.98% (which is greater than the THD required by the IEEE-519-2014 standard) to 2.98% (which is less than the THD required by the IEEE-519-2014 standard), demonstrating the effectiveness of the solution. Accordingly, the control scheme 300 may be used to facilitate compliance with standards and regulations set by additional industry and/or governmental bodies.

Other implementations are within the scope of the claims. For example, although the control scheme 300 is capable of minimizing, reducing, or eliminating harmonic current content at the PCC (or power grid) nodes 206 and at the intermediate nodes 214a, 214b, 214c without the use of additional active and/or passive filters, the control scheme 300 may be applied to a system that includes additional active and/or passive filters.

What is claimed is:

1. A bi-directional power converter comprising:
   a plurality of input nodes, each input node configured to electrically connect to one phase of a multi-phase AC electrical power distribution network;
   an electrical network configured to convert alternating current (AC) to direct current (DC) and to convert DC current to AC current, the electrical network comprising a plurality of electronic switches; and
   a control system configured to:
      estimate harmonic voltage content at three intermediate nodes in the bi-directional power converter based on a measured electrical quantity; and
      control the electronic switches to compensate for the estimated harmonic voltage content.

2. The bi-directional power converter of claim 1, further comprising:
   a filter system between the input nodes and the electrical network; and wherein the intermediate nodes are between the filter system and the electrical network.

3. The bi-directional power converter of claim 2, wherein the measured electrical quantity comprises an indication of an AC current that flows in each of the three intermediate nodes.

4. The bi-directional power converter of claim 2, wherein the filter system comprises:
   a first filter system electrically connected to a first one of the input nodes and to a first one of the three intermediate nodes, the first filter system comprising: a first grid-side inductor, a first converter-side inductor, and a first capacitor;
   a second filter system electrically connected to a second one of the input nodes and to a second one of the three intermediate nodes, the second filter system comprising: a second grid-side inductor, a second converter-side inductor, and a second capacitor; and
   a third filter system electrically connected to a third one of the input nodes and to a third one of the three intermediate nodes, the third filter system comprising: a third grid-side inductor, a third converter-side inductor, and a third capacitor.

5. The bi-directional power converter of claim 1, wherein the measured electrical quantity comprises a measured AC current at each intermediate node.

6. The bi-directional power converter of claim 1, wherein the measured electrical quantity comprises an indication of an AC current that flows in at least two of the intermediate nodes.

7. The bi-directional power converter of claim 1, wherein to compensate for the estimated harmonic voltage content, the control system controls the electronic switches to reduce harmonic current content at the plurality of input nodes.

8. The bi-directional power converter of claim 1, wherein to compensate for the estimated harmonic voltage content, the control system is configured to:
   generate a control signal based on the estimated harmonic voltage content; and
   to apply the control signal to the electronic switches to generate a waveform that compensates for the estimated harmonic voltage content, such that harmonic current content at the plurality of input nodes is reduced.

9. The bi-directional power converter of claim 1, wherein the multi-phase AC electrical power distribution network comprises: a first phase, a second phase, and a third phase; and wherein:
   the control system comprises:
      a first control block comprising a first harmonic compensator configured to estimate harmonic voltage content at a first one of the three intermediate nodes;
      a second control block comprising a second harmonic compensator configured to estimate harmonic voltage content at a second one of the three intermediate nodes; and a third control block comprising a third harmonic compensator configured to estimate harmonic voltage content at a third one of the three intermediate nodes.

10. The bi-directional power converter of claim 1, wherein each of the plurality of electronic switches comprises a transistor.

11. The bi-directional power converter of claim 1, wherein the electrical network comprises a rectifier and an inverter, and the inverter is configured to produce an AC driver signal for a motor load.

12. The bi-directional power converter of claim 1, wherein the electrical network comprises an active front end (AFE) rectifier.

13. A control system comprising:
    a voltage regulation block configured to determine an AC reference current value based on a DC electrical quantity of a power converter; and
    a current regulation block configured to receive the AC reference current value, the current regulation block comprising:
        a harmonics compensation block configured to estimate harmonic voltage content at an intermediate node of the power converter based on an AC current at the intermediate node; and
        a control block configured to generate a voltage control signal based on the estimated harmonic voltage content, and to provide the voltage control signal to the power converter to reduce harmonic current content at an input node of the power converter, wherein the input node of the power converter is electrically connected to an alternating current (AC) power grid.

14. The control system of claim 13, wherein the power converter comprises a bi-directional power converter.

15. A method comprising:
    estimating harmonic voltage content at least two intermediate nodes of a power converter based on a measured AC current at the at least two intermediate nodes;
    generating a voltage control signal for the power converter based on the estimated harmonic voltage content; and
    providing the voltage control signal to the power converter to thereby reduce total harmonic distortion at input nodes of the power converter, wherein each input node is electrically connected to one phase of a three-phase alternating current (AC) power grid.

16. The method of claim 15, wherein the harmonic voltage content is estimated at each of at three intermediate nodes of the power converter based on a measured AC current at each of the three intermediate nodes, and generating the voltage control signal comprises generating a voltage control signal for each of three phases of the power converter.

17. The method of claim 15, wherein providing the voltage control signal to the power converter comprises providing a voltage control signal to each phase of an active front end of the power converter.

* * * * *